United States Patent
Raclavský

(10) Patent No.: US 10,435,760 B2
(45) Date of Patent: Oct. 8, 2019

(54) FLUXING AGENT, PROCESS OF ITS PRODUCTION, AGGLOMERATION MIXTURE AND USE OF SLUG FROM SECONDARY METALLURGY

(71) Applicant: ECOFER, s.r.o., Třinec-Dolní Líšná (CZ)

(72) Inventor: Milan Raclavský, Ostrava-Poruba (CZ)

(73) Assignee: ECOFER, S.R.O., Trinec-Dolni Listna (CZ)

( * ) Notice: Subject to any disclaimer, the term of this patent is extended or adjusted under 35 U.S.C. 154(b) by 473 days.

(21) Appl. No.: 14/903,429

(22) PCT Filed: Jul. 2, 2014

(86) PCT No.: PCT/CZ2014/000075
§ 371 (c)(1),
(2) Date: Jan. 7, 2016

(87) PCT Pub. No.: WO2015/003669
PCT Pub. Date: Jan. 15, 2015

(65) Prior Publication Data
US 2016/0160302 A1    Jun. 9, 2016

(30) Foreign Application Priority Data
Jul. 8, 2013  (CZ) .................................... 2013-531

(51) Int. Cl.
| | | |
|---|---|---|
| *C04B 28/08* | (2006.01) | |
| *C04B 5/00* | (2006.01) | |
| *C04B 28/02* | (2006.01) | |
| *C04B 5/06* | (2006.01) | |
| *C21C 5/36* | (2006.01) | |
| *C21C 5/54* | (2006.01) | |
| *C21C 7/076* | (2006.01) | |
| *C21B 3/04* | (2006.01) | |
| *C21B 13/00* | (2006.01) | |

(52) U.S. Cl.
CPC .................. *C21B 3/04* (2013.01); *C04B 5/00* (2013.01); *C04B 5/06* (2013.01); *C04B 28/02* (2013.01); *C04B 28/082* (2013.01); *C04B 28/085* (2013.01); *C21B 13/008* (2013.01); *C21B 13/0046* (2013.01); *C21B 13/0066* (2013.01); *C21C 5/36* (2013.01); *C21C 5/54* (2013.01); *C21C 7/076* (2013.01); *Y02P 10/216* (2015.11); *Y02P 10/242* (2015.11); *Y02W 30/542* (2015.05)

(58) Field of Classification Search
CPC .. C21C 5/36; C21C 5/54; C21C 7/076; C04B 5/06; C04B 5/00; C04B 28/02; C04B 28/082; C04B 28/085; Y02W 30/543
See application file for complete search history.

(56) References Cited

U.S. PATENT DOCUMENTS

| | | | |
|---|---|---|---|
| 5,397,379 A * | 3/1995 | Barker | C21C 7/0075 75/303 |
| 6,682,583 B1 | 1/2004 | Morioka et al. | |
| 7,377,955 B1 * | 5/2008 | Shaw | B03B 9/04 241/18 |
| 8,523,977 B2 * | 9/2013 | Panda | C21C 7/06 65/19 |
| 9,175,363 B2 * | 11/2015 | Gunther | C22B 1/20 |
| 2009/0049955 A1 | 2/2009 | Memoli et al. | |
| 2011/0023656 A1 | 2/2011 | Kunii et al. | |

FOREIGN PATENT DOCUMENTS

| | | |
|---|---|---|
| EP | 1 405 924 A1 | 4/2004 |
| EP | 2 216 419 A2 | 8/2010 |
| FR | 2991693 A1 * | 12/2013 |
| JP | 2012117082 A * | 6/2012 |
| KR | 2009 0073504 A | 7/2009 |
| RU | 2064508 * | 7/1996 |
| WO | 2004/101828 A1 | 11/2004 |
| WO | 2007/136914 A2 | 11/2007 |

OTHER PUBLICATIONS

Poirier et al. FR 2991693 A1 machine translation. (Year: 2013).*
RU 2064508 machine translation of the description. (Year: 1996).*
JP-2012117082-A machine translation (Year: 2012).*
Yildirim, Irem Zeynep and Monica Prezzi. "Chemical Mineralogical, and Morphological Properties of Steel Slag." Advances in Civil Engineering. vol. 2011, Article ID 463638, 13 pages doi:10.1155/2011/463638 (Year: 2011).*
JP 2012117082 human translation (Year: 2012).*
M. Makela, et al; 'Evaluation of Trace Element Availability from Secondary Metallurgical Slag Genrated in Steelmaking by Sequencial Chemical Extraction'; The International Journal of Environmental Science and Technology; Feb. 26, 2013.
JRC Reference Report, "Best Available Techniques (BAT) Reference Document for Iron and Steel Production", p. 475 (2013).
EUROFER, Steel Industry Adjustment Policy (2015 Revision), Appendix, Articles 28 and 37 (2015).

* cited by examiner

*Primary Examiner* — Tima M. McGuthry-Banks
(74) *Attorney, Agent, or Firm* — Ladas & Parry LLP

(57) ABSTRACT

The invention relates to fluxing agents for the agglomeration process based on slag from the secondary metallurgy, the use of these fluxing agents in the process of agglomeration in the manufacture of the agglomerate designed for the use as a metallic charge in blast furnaces and a process of production of fluxing agents based on slag from the secondary metallurgy or based on a mixture of slag from the secondary metallurgy with other materials.

8 Claims, No Drawings

FLUXING AGENT, PROCESS OF ITS PRODUCTION, AGGLOMERATION MIXTURE AND USE OF SLUG FROM SECONDARY METALLURGY

CROSS-REFERENCE TO RELATED APPLICATION

This U.S. application claims priority under 35 U.S.C 371 to, and is a U.S. National Phase application of, the international Patent Application No, PCT/CZ2014/000075, filed 2 Jul. 2014 which claims priority from CZ PV 2013-531 filed on 8 Jul. 2013, the disclosures of which are incorporated in their entirety by reference herein.

TECHNICAL FIELD

The invention relates to:
fluxing agents for an agglomeration process based on slag from the secondary metallurgy,
agglomeration mixtures with flux agents for a production of an agglomerate (sinter)
the use of fluxing agents in the process of agglomeration in the production of an agglomerate designed for a metallic charge in blast furnaces,
process of production of flux agents based on slag from the secondary metallurgy or based on a mixture of slag from the secondary metallurgy with other materials

DESCRIPTION OF THE PRIOR ART

Steel is produced mainly in converters, and electric arc furnaces. The main charge for the production of steel comprises pig iron and a steel scrap. Pig iron is produced in blast furnaces where the main charge is formed by iron ore, iron ore pellets, fluxing agents and coke. Before the processing in a blast furnace, the iron ore is modified in an agglomeration process. The aim of the agglomeration process is to dress the ore so as to be suitable as a charge into a blast furnace. During the agglomeration process, the adjustment of the ore granulometry and the change of its chemical composition take place, particularly as far as the ratio of the content of oxides CaO and $SiO_2$ is concerned.

Pig iron produced is processed in converters by means of a finery process, during which through the action of oxygen the removal of carbon, silicon and phosphorus from pig iron takes place. The treatment product is called crude steel which is in the most cases similar to the crude steel from electric arc furnaces. This crude steel is characterized by a low carbon content and a high activity of oxygen greater than 200 ppm, usually around 600 ppm of oxygen. During the tapping operation, crude steel is deoxidized with aluminium, silicon, manganese, chromium, or with other elements. Deoxidized steel is further treated in the secondary metallurgy on an equipment such as LF (pot furnace), VD, RH, DH, VAD, VDNOD (different types of devices for vacuum steel processing), and the like. In the devices of the secondary metallurgy is steel in the final stage treated in reducing conditions. This treatment also affects the composition of slag. Slags have a low activity of oxygen and a low content of FeO. For steels deoxidized with aluminium, the FeO value is up to 5% by weight, optimally up to 1% by weight. For slags deoxidized with silicon and manganese, it is up to 10% by weight, optimally up to 5% by weight. These slags are able to bind substantial amounts of sulphur. According to the deoxidizing process, there are slags from a steel production, where the dominant deoxidizing agent (deoxidizer) is aluminium, and slags from the steel production, where the dominant deoxidizing agent is silicon or manganese, or their mixture. Deoxidation products are oxides of these elements, which are typically bound to lime. Consequently, oxide melts slags are produced, whose chemical composition is shown in the following table:

Table of an approximate extent of the composition of slags in the secondary metallurgy (percent by weight)

|  | CaO | $SiO_2$ | $Al_2O_3$ | MgO | MnO |
|---|---|---|---|---|---|
| Deoxidizing Al | 40-70 | 0-15 | 5-35 | 3-15 | 0-2 |
| Deoxidizing Al, Si, Mn | 25-65 | 10-30 | 10-30 |  | 0-5 |
| Deoxidizing Si, Mn | 30-65 | 10-50 | 0-15 | 2-20 | 0-20 |

The properties of these slags, such as self-crumbling, dust formation, instability, significantly complicate their use. According to the manual, the BAT (Best Available Technology), up to 80% of these slags are stock-piled. Their use is difficult.

Use of Slag from Secondary Metallurgy

Slags produced in the secondary metallurgy are difficult to use. The most common and the most widespread method of utilisation of these slags consists in mixing them with other steel slags, that are after a longer exposure to air and rain, after aging, used in the construction industry. During solidifying, they generally disintegrate to a fine dust, which, moreover, as a result of the presence of free lime during the hydration significantly increases its volume. The disadvantage of this procedure is particularly a difficult controllable expansion of slags, which is manifested, for example, through buckling built roads and motorways. This negative feature prevents their wider use in the construction. A large part of slag is therefore deposited without further utilisation on slug heaps.

The problem of the utilisation of slag was further addressed in the project FI-IM5/133 in the Czech Republic, Italy and Poland. The project used the positive characteristics of this slag, especially a low-temperature melting, which allows a quick creation of homogeneous steel slag in a steel aggregate. The utilisation of slag from the secondary metallurgy was solved also in the frame of the European Research Project No 7210-PR/203, which calculates with the use of slag in an electric arc furnace (EAF). This procedure is suitable for the recycling of slag directly in a steel-making plant equipped with the EAF, but requires a so-called chunk-forming of slag, which is costly. The utilization of slag from integrated plants is not possible for capacity reasons and due to additional transport costs.

The company Harsco invented a process according to the patent WO2007/136914 A3, in which slags from the secondary metallurgy are utilized so that they are mixed with remnants of linings under the creation of refining slag-making materials suitable for a further use. Limitation of this method is given only through economic aspects.

From the US Patent No 20090049955, a process for slug recycling is also known, which is based on the utilization of slag from the secondary metallurgy in an electric arc furnace (EAF). In doing so, slag is added to EAF as a fluxing agent and the source of CaO. This procedure is also not used for capacity reasons and additional transport costs.

The solution according to the patent WO2004101828 uses slag for the production of bonding materials and synthetic slag. However, the disadvantage of this solution is the requirement for a close range and stability of the chemical and phase composition of the slag.

M. Mäkelä; I. Välimäki; R. Pöykiö; H. Nunnesniemi; O. Dahl in the article "Evaluation of trace element availability from secondary metallurgical slag generated in steelmaking by sequential chemical extraction"; The International Journal of Environmental Science and Technology; Available online 26 Feb. 2013 quotes that unlike the slag from blast furnaces and converters, the slag from the secondary metallurgy is predominantly deposited on heaps.

Recycling of Slag in the Agglomeration

A procedure for recycling a part of converter slag with a higher iron content is known. This procedure is admittedly widespread, but its main drawback consists in a re-reduction of phosphorus contained in this slug into pig iron.

Pelletizing and Agglomeration Process

The agglomeration is used to prepare a charge into blast furnaces and this process is not used for recycling other slags than those from the converter process. Raw materials for the agglomeration process are the following raw materials:
   iron-forming ores, scales, metallic waste, etc.,
   fluxing agents (mostly slag-forming parts of a charge)—limestone, lime, dolomite, feigh, etc.,
   fuels and reducing agents—coke, natural gas, etc.

These raw materials are mix and homogenized in several steps. The first step is the creation of homogenization heaps and the last step proceeds for example in a pelletizing drum. In new modern plants, all the operations of the charge preparation may be integrated into a single device, which is able to replace all stages of homogenization and pelletizing.

In the course of the agglomeration, a mixture of the homogenised material placed on an agglomeration belt is heated to a temperature higher than 1000° C. At these temperatures, the smelting and aggregation of individual grains of input materials take place. As a result of the aggregation process, pieces of the agglomerate suitable for the use as a charge in blast furnaces are formed.

For the improvement of the agglomeration process, materials based on water glass are also added, as described in the U.S. Pat. No. 6,682,583. Both of these procedures improve the pelletizing of raw materials in the agglomeration process, but on the other hand, they impair the heat and material balance of a blast furnace process.

SUMMARY OF THE INVENTION

The above problems with the use of slag from the secondary metallurgy, the improvement of the pelletizing process as well as the improvement of the smelting process are to a large extent solved by a process of production of an agglomerate according to the invention, in which the agglomerate is designed for the use as a charge in blast furnaces, and the process makes use of screened, crushed slags of the secondary metallurgy as fluxing agents, or mixtures of this slag with other materials, wherein the subject matter of the invention lies in the mixing of these slags with other charging materials; of the agglomeration process in homogenization heaps or in receivers so that the total content of slag from the secondary metallurgy is less than 10% by weight of the total charge in the agglomeration process.

After casting steel, slags from the secondary metallurgy, together with the metal residues, are poured out from a ladle into slag pots. After cooling, large pieces of metal, so called pigs, are removed. Subsequently, the slag is sized and appropriately even crushed to a fraction under 100 mm. For a subsequent use, the fractions of the sized slag having the size below 100 mm, optimally below 10 mm, appear as optimal. If a demetallization of slag is required, it is possible to perform a magnetic separation of iron from the slag. In such a way processed slag or slag mixtures are added to the charge of the agglomeration process at the latest into a pelletizing drum or into a device with the same function.

The best solution seems to be to admix slag or a slag mixture into a homogenization drum or into homogenization heaps or through containers on a belt, where such slug or the slag mixture is mixed with other charging materials in quantities of less than 10% by weight of the total charge in the agglomeration process, optimal in quantities of 0.5 to 1.5% by weight, wherein at least 90% by weight of slag has a grain size bellow 100 mm and optimally bellow 10 mm.

Before the use in the agglomeration, other materials such as lime, limestone, dolomite, dolomite limestone, undersize coke and waste materials or by-products of metallurgical or cement industry can be added to these slags or slag mixtures.

The main advantage of this method according to the invention is the possibility of reducing energy requirements of the agglomeration process up to 10%, together with the improvement of mechanical properties of the produced agglomerate, as well as a reduction of fine portions of the agglomerate which would have been otherwise recycled in the agglomeration process. Another advantage is the utilization of a residual metal, the increase of the MnO content in the agglomerate, especially by recycling slag from the production of manganese and silicon killed steel. A side effect consists in a reduction of $CO_2$ emissions from fuel and from carbonates, particularly limestone and dolomite.

Another favourable property of slags from the secondary metallurgy, usable in the agglomeration, is their self-desaggregation and creation of fine dust fractions. The fine dust fractions create large reaction surfaces, help to pelletizing, and the slag need not be crushed. Because the slags do not contain $CO_2$, the release of which requires a considerable amount of heat, their use influences favourably the total heat balance of the agglomeration process. When using slags from the secondary metallurgy as a flux and as a substitution or a partial substitution for limestone, lime, dolomite or other materials, there is a substantial reduction in the temperature of smelting on the borders of grains. The melting temperature of lime is 2612° C., while the slag eutectics from the secondary metallurgy show the smelting temperature of about 1300° C.

In this way it is possible to recycle both the whole slag from the secondary metallurgy of integrated plants and slag from steel-works that produce steel in electric arc furnaces. The invention solves in a practical and inexpensive way the utilization of slag from the secondary metallurgy and its use in the agglomeration process.

BRIEF DESCRIPTION OF THE DRAWINGS

Explanation of the invention does not need FIGURES.

DETAILED DESCRIPTION OF THE INVENTION

The method of production of the agglomerate, designed for the use as a charge into blast furnaces, can be used in accordance with the invention for various types of slag or slag mixtures of the secondary metallurgy as a substitution or a partial substitution for limestone, lime and dolomite or other steel or metal additives.

The invention will be closer illustrated in the following examples of the implementation according to the invention:

Example 1

Steel from a converter or from electric arc furnaces or similar devices, such as the hybrid device Conarc, is tapped into a ladle, and deoxidized through aluminium, silicon, manganese, or other deoxidizing elements. In such a way modified steel is processed in a secondary metallurgy device and after the processing it is ready for casting, for example on a device for a continuous casting or in the form of an ingot. After the casting, the remaining slag and the remnants of steel in the ladle are poured into a slag pot and after filling up thereof, they are transported on a slag deposit. After cooling and solidifying, coarse pieces of the remaining steel are removed mechanically. Slag disintegrates mostly spontaneously to a fine dust mass. Slag disintegrates, if the cooling rate is lower than 200° C. per hour. The slag, which does not disintegrate spontaneously, is mechanically crushed on the granulometry under 100 mm or it is utilised in a different manner. In such a way modified slag is ready for a further use as a raw material for the agglomeration process. Slags with lower contents of $SiO_2$ (below 15%) are more appropriate for the above use.

Slags and slag-forming materials are admixed to an agglomeration mixture so that the generation of unnecessary amount of slag in the blast-furnace process is prevented. The composition of fluxing agents in the agglomerate is carried out so that the resulting ratio of $CaO/SiO_2$ in the agglomerate is higher than 0.5 and optimally around 0.8-1.5. Also the total content of $Al_2O_3$ is limited, namely by the value of 8%. For example, ores and ore concentrates have 4 to 10% $SiO_2$ with the content of CaO around 2% and, therefore, it is necessary to add the corresponding amount of CaO so that the ratio of CaO to $SiO_2$ matches a value of 0.8 to 2.5 in accordance with the practice of a particular blast furnace plant, advantageously in the range of 0.8 to 1.5. From these ratios and from the composition of slag from the secondary metallurgy or its mixture with other materials, it is simply possible to derive the necessary additions of the slag or the slag mixture. The respective slag from the secondary metallurgy constitutes a fluxing agent applicable in the agglomeration process.

Example 2

Slag from the secondary metallurgy having the granulometry under 100 mm is mixed with other slag-forming materials such as lime, limestone, dolomite, dolomite limestone, magnesite, optionally with a fuel in the form of fine-grained coke. The mixture, prepared in such a way, is ready for the subsequent use as a fluxing agent for the agglomeration process.

Example 3

The slug from the production of aluminium-killed steel is mixed with the slug from the steel killed by silicon or manganese. After mixing and adjustment of granulometry, the slug is ready for the subsequent use as a fluxing agent for the agglomeration process.

Example 4

In the agglomeration process, a part or entire slag from the secondary metallurgy created in the respective steel-making plant is used, and in the case of low transport costs, it is possible to admix to this slag also slag from the secondary metallurgy of nearby steel-making plants, especially from electric steelworks. The respective slag from the secondary metallurgy constitutes a fluxing agent applicable in the agglomeration process.

Example 5

After cooling, coarse metal pigs are first removed from the slag from the secondary metallurgy of the production of aluminium-killed steel, and, subsequently, the slag is graded on graders into individual fractions. For the direct use in the agglomeration process, the slag fractions with granulometry under 100 mm, conveniently under 20 mm are used. The remaining coarse pieces of slag are crushed to finer fractions for the use in the agglomeration process, or they are used in a different way. The slag mixture, processed in such a way, is evenly scattered into slag heaps, preferably in doses from 10 tonnes.

Slag can be added to the charge in a single portion or in several portions in individual stages of the homogenization, however, at the latest into a pelletizing drum or into a device with the same function so that the total content of slag in the charge of the agglomeration process corresponds to a maximum of 10% of the total charge into the agglomeration.

Example 6

The slag produced in accordance with the example 1 is further enriched with materials such as lime, limestone, dolomite, dolomite limestone, undersize coke, waste materials or by-products of metallurgical or cement industry. Slag or slag-forming mixtures with recycled materials can be added individually or in arbitrary mixtures, and they are added to the metallic charge in an arbitrary phase of homogenisation in a single portion or in several subsequent steps, however, at the latest into a pelletizing drum or into a device with the same function. The amount of slug from the secondary metallurgy is always lower than 10% by weight of the total weight of the charging materials of the agglomeration process.

Example 7

This example consists in the utilisation of slags from the production of silicon and manganese-killed steel, the total content of $SiO_2$+MnO+FeO of which is higher than 15% by weight. Also these slags can be used for the production of agglomeration mixtures or even added directly into such mixtures. Similarly as in the example 1 and 2, these slags are freed from the coarse pigs, subsequently sorted, possibly also crushed and prepared for the use. The fractions under 100 mm, conveniently under 20 mm are used. These slugs can be used directly or mixed with other materials similarly as described in the example 2.

The invention claimed is:

1. A sinter mixture usable as a charge in an agglomeration process comprising
   (a) a metallic ore;
   (b) a fluxing agent;
   (c) a modified slag from secondary metallurgy produced by a process comprising (a) providing slag formed during a tapping and treatment operation in which crude steel is deoxidized with a deoxidizer comprising (i) aluminum, (ii) aluminum, silicon and manganese or (iii) silicon and manganese such that the slag comprises oxides of the deoxidizer, and (b) modifying the slag so that at least 90% by weight of the slag has a grain size under 100 mm; and
   (d) a fuel;
wherein the modified slag from secondary metallurgy is present in the sinter mixture in an amount of less than 10% by weight, wherein the sinter mixture contains less than 8% by weight of $Al_2O_3$, and wherein the modified slag from secondary metallurgy comprises a mixture of oxides, including CaO, $Al_2O_3$, $SiO_2$, MgO, MnO, and FeO and has a smelting temperature that is lower than 1600° C., wherein a total content of the oxides in the modified slag from secondary metallurgy is higher than 75% by weight, a content of CaO is higher than 40% by weight, a content of sulfur is lower than 2.5% by weight, and wherein the modified slag from secondary metallurgy has a content of FeO of not more than 5% by weight.

2. The sinter mixture according to claim 1, wherein the fluxing agent and the modified slag from secondary metallurgy together form a fluxing mixture, and the fluxing mixture comprises, in addition to the modified slag from secondary metallurgy, a waste material.

3. The sinter mixture according to claim 2, wherein a ratio of $CaO/SiO_2$ by weight and $CaO/Al_2O_3$ by weight in the fluxing mixture is higher than 1.25.

4. The sinter mixture according to claim 1, comprising less than 5% by weight of $Al_2O_3$.

5. The sinter mixture according to claim 1, wherein the fluxing agent and the modified slag from secondary metallurgy together form a fluxing mixture.

6. A sinter mixture usable as a charge in an agglomeration process comprising
  (a) metallic ore;
  (b) a fluxing agent;
  (c) a modified slag from secondary metallurgy produced by a process comprising (a) providing slag formed during a tapping and treatment operation in which crude steel is deoxidized with a deoxidizer comprising (i) aluminum, (ii) aluminum, silicon and manganese or (iii) silicon and manganese such that the slag comprises oxides of the deoxidizer, and (b) modifying the slag so that at least 90% by weight of the slag has a grain size under 100 mm; and
  (d) a fuel;
wherein the modified slag from secondary metallurgy is present in the sinter mixture in an amount of less than 10% by weight, wherein the sinter mixture contains less than 8% by weight of $Al_2O_3$, and wherein the modified slag from secondary metallurgy has a content of FeO of not more than 5% by weight.

7. A method for forming a sinter mixture usable as a charge in an agglomeration process, wherein the sinter mixture comprises
  (a) a metallic ore;
  (b) a fluxing agent;
  (c) a modified slag from secondary metallurgy produced by a process comprising (a) providing slag formed during a tapping and treatment operation in which crude steel is deoxidized with a deoxidizer comprising (i) aluminum, (ii) aluminum, silicon and manganese or (iii) silicon and manganese such that the slag comprises oxides of the deoxidizer, and (b) modifying the slag so that at least 90% by weight of the slag has a grain size under 100 mm; and
  (d) a fuel;
wherein the modified slag from secondary metallurgy is present in the sinter mixture in an amount of less than 10% by weight, and wherein the sinter mixture contains less than 8% by weight of $Al_2O_3$, the method comprising the steps of:
  (i) preparing a fluxing mixture by modifying the slag from secondary metallurgy by gradually cooling the slag from secondary metallurgy at a cooling rate of up to 200 degrees Celsius per hour to cause spontaneous disintegration of part of the slag and then sizing or crushing a remainder of the slag such that at least 90% by weight has the grain size below 100 mm and mixing the modified slag from secondary metallurgy with the fluxing agent to form the fluxing mixture; and
  (ii) admixing the fluxing mixture with the metallic ore and the fuel and optionally another fluxing agent, waste material or both to form the sinter mixture, wherein the modified slag from secondary metallurgy is present in the sinter mixture in an amount of less than 10% by weight.

8. The method according to claim 7, wherein the sinter mixture is charged into a blast furnace.

* * * * *